United States Patent

Schweizer

[15] 3,643,269
[45] Feb. 22, 1972

[54] DYEING SYNTHETIC POLYAMIDE FIBERS WITH DISULFONATED DIARYL BIS AXO CARBONILIDES

[72] Inventor: August Schweizer, Muttenz, Switzerland

[73] Assignee: Sandor Ltd. (also known as Sandoz A.G.), Basel, Switzerland

[22] Filed: Sept. 30, 1968

[21] Appl. No.: 763,925

[30] Foreign Application Priority Data

Oct. 25, 1967 Switzerland ..........................15022/67

[52] U.S. Cl. ..........................................8/41, 8/178, 8/21 B, 8/25, 8/26, 260/175
[51] Int. Cl. .........................................................D06p 1/20
[58] Field of Search ................................8/178, 41; 260/175

[56] References Cited

UNITED STATES PATENTS

| 935,016 | 9/1909 | Gunther et al. | 260/175 |
| 935,017 | 9/1909 | Gunther et al. | 260/175 |
| 935,018 | 9/1909 | Gunther et al. | 260/175 |
| 2,666,757 | 1/1954 | Richter | 260/175 |
| 3,306,952 | 2/1967 | Stanton et al. | 8/178 X |

OTHER PUBLICATIONS

Schmidlin, Prep. & Dye. Syn. Fibres, 1963, p. 200. AATCC Tech. Man., 1968 Ed., Vol. 44, p. B– 59 Color Index, Vol. 2, 1956 Second Ed., p. 2018.

*Primary Examiner*—Donald Levy
*Assistant Examiner*—Patricia C. Ives
*Attorney*—Irwin Morton Aisenberg

[57] ABSTRACT

"A process for dyeing or printing polyamide fibers with dyes of the formula

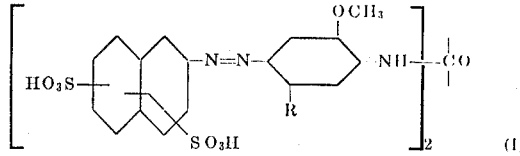

where R stands for methyl or ethyl, or with dyes of the formula or their water soluble salts".

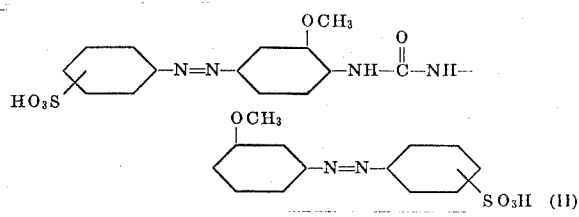

10 Claims, No Drawings

DYEING SYNTHETIC POLYAMIDE FIBERS WITH DISULFONATED DIARYL BIS AXO CARBONILIDES

This invention relates to a process for dyeing or printing synthetic polyamide fibers with dyes of the formula

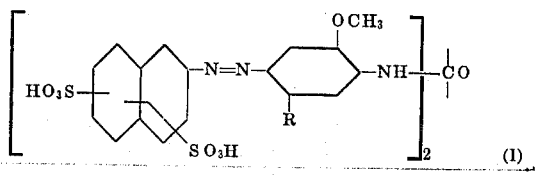

where R stands for methyl or ethyl, or with dyes of the formula

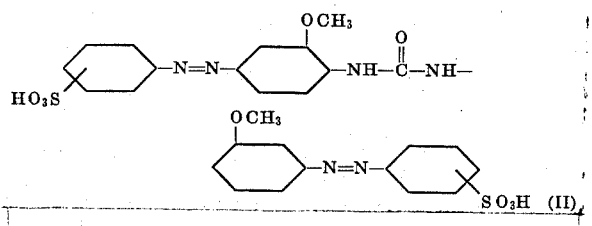

or their water soluble salts. Symmetrical of asymmetrical dyes of formula (II) can be employed for dyeing or printing; the symmetrical dyes of this formula give very good dyeings and prints.

The synthetic polyamide fibers may be of the type produced by condensation of 1,6-hexamethylene-diamine and adipic or sebacic acid (Nylon 66), by polymerization of ε-carprolactam (nylon 6), by condensation of w-aminoundecanoic acid, or by mixed condensation of 1,6-hexamethylene-diamine, adipic acid and ε-carprolactam. The dyes of formulas (I) and (II) may be applied as free sulphonic acids or as water soluble salts, preferably the alkaline salts, of these acids. They can be employed as liquid preparations containing, per 1 part by weight of dye, 1 to 8 parts by weight of water and 0.5 to 5 parts by weight of an acid amide, e.g., urea, or as solid dye preparations containing a granulated dye with an average particle size of 20 microns which is soluble to at least 2 percent in water at 25° C. and a maximum of 50 percent of one of the salts normally used for dye preparations which dissociate in water, e.g., Glauber's salt.

These liquid and solid dye preparations are suitably diluted with water before addition to the dyebath or printing paste.

The dyes are used according to normal exhaustion and continuous dyeing processes with excellent results. Similarly, excellent prints are obtained on polyamide fibers using the standard printing processes. Carpets can be successfully dyed with these dyes.

The dyes are generally applied from weakly alkaline to strongly acid medium at pH values of 1 to 8 or, preferably, 3 to 7. The best temperature range for application is 60°–100° C. or, at increased pressure, above 100° C. (in high temperature processes to about 130° C.); the dyeing times range from about 30 to 150 minutes. The dyebath may be set with the normal dyeing assistants, for example organic or inorganic acids, such as acetic, formic or sulphonic acid; neutral salts, such as sodium sulphate; anionic compounds, such as sodium dimethylmethane disulphonate or highly sulphonated castor oil; or nonionic compounds, such as alkyl-polyglycol- or alkylaryl-polyglycol ethers, the reaction products of alkyl amines or fatty acid amides and ethylene oxides. These additions are employed to promote level dyeing or to correct the tendency to barry dyeing due to affinity differences in the substrate.

Further, the dyebath may contain aromatic and/or aliphatic alcohols, e.g., ethanol and benzyl alcohol, or assistants which form a coacervate. The dyes are useful for the pad-batch process. The liquor ratios generally range from 1:3 to 1:60, the optimum ratio being 1:30.

The dyes may be applied in mixture with each other or with other dyes, e.g., other anionic, or acid, premetallized, reactive or basic dyes.

The printing pastes can be prepared with any of the normal assistants, for example solvents for dyestuffs, preferably those giving an increase in depth of dyeing, such as urea, thiodiethylene glycol, guanidine, benzyl alcohol, butylcarbitol, phenol or resorcinol. They may contain further swelling agents which, depending on the composition of the substrate, permit very heavy shades to be produced; examples are thiourea, phenol and resorcinol. Acid donors, such as ammonium tartrate, and thickening agents, such as locust bean and crystal gum, starches, starch decomposition products and alginates, are other suitable additions. Printing pastes may also contain an agent which forms a coacervate, e.g., alkylarylpolyglycol ether or one of the reaction products of alkylamines or fatty acid amides and ethylene oxides. The printing pastes can be applied in the form of emulsions by roller, screen or other printing processes.

The dyes can be fixed by any of the known methods, e.g., with saturated or superheated steam, at atmospheric or superatmospheric pressure, in dry heat, or by cold batching or infrared radiation. After fixation the prints are finished in the normal way.

The dyeings and prints obtained are of very bright shade and have good fastness to light and wet tests, such as water, washing and perspiration. The dyes have good power of buildup on substrates of widely different affinity, which means that very heavy dyeings can be produced with small amounts. Dyes of formulas (I) and (II) can be dyed in combination with blue dyes without the dyeings showing catalytic fading; these combination dyeings fade tone-in-tone.

In the following examples the parts and percentages are by weight and the temperatures in degrees centigrade.

EXAMPLE 1

A printing paste is prepared with 6 parts of the dye of formula

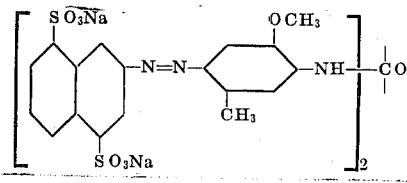

390 parts of water, 450 parts of 8 percent aqueous locust bean thickening, 60 parts of thiourea and 60 parts of a 30 percent aqueous ammonium 40 solution. The paste is roller printed on a woven fabric of nylon 66 fiber, and after drying the print is fixed for 20 minutes at 102° in a continuous steamer, washed off and dried. A deep yellow print with good light and wet fastness properties is obtained.

EXAMPLE 2

7 Parts of the dye specified in Example 1 are mixed with 282 parts of water at 40° and the mixture is stirred into 550 parts of a 30 percent aqueous crystal gum solution containing 50 parts of urea, 50 parts of thiodiethylene glycol and 60 parts of a 30 percent aqueous ammonium sulphate solution. This paste is roller printed on a smooth fabric of nylon 66 fiber. The print is dried, fixed, washed off and dried as outlined in Example 1. A yellow print with good fastness properties is obtained.

EXAMPLE 3

3.5 Parts of the dye used in Example 1 are mixed with 50 parts of urea and then with 386 parts of water at 50°. The mixture is stirred into 500 parts of an 8 percent aqueous solution of etherified locust bean thickening and 600 parts of a 30 percent aqueous ammonium sulphate solution. Then 10 parts of nonylphenyl polyglycol ether with an ethylene oxide content of 4–6 are added with vigorous stirring to form an emulsion. The emulsion is screen printed on a fabric of texturized nylon 6 (Perlon) fiber, and the print is dried, fixed for 40 minutes in saturated steam at normal pressure, and washed off. A print of deep yellow shade is obtained which presents an even appearance on the surface of the texturized, bulky fabric.

EXAMPLE 4

1.5 Parts of the dye used in Example 1 are mixed with 630 carpet of cold water and the mixture is stirred into 330 parts of a 4 percent aqueous solution of etherified locust bean gum and 20 parts of concentrated acetic acid. Finally 10 parts of nonylphenyl polyglycol ether with an ethylene oxide content of 4–6 is added to convert the solution into an emulsion. The emulsion is screen printed on a tufted carpet of nylon 66 fiber, and, without intermediate drying, the print is fixed for 8 minutes in saturated steam at normal pressure. The CARPET is washed off and dried in the normal way. It is printed in a yellow shade which has very good fastness properties.

EXAMPLE 5

3 Parts of the dye of Example 1 are stirred into 450 parts of cold water and mixed with 500 parts of a 4 percent aqueous solution of sodium alginate thickening and 20 parts of crystallized ammonium sulphate. 10 Parts of nonylphenyl polyglycol ether with an ethylene oxide content of 4–6 are added to convert the solution into an emulsion. The emulsion is roller printed on a loosely knitted fabric of texturized nylon 66 fiber and, without intermediate drying, the print is fixed by steaming for 3 minutes and washed off. The fabric is unraveled and the partially printed yarns used to produce tufted carpet with space dyed effects.

EXAMPLE 6

A dyebath is set with 0.4 parts of the dye used in Example 1 and 2,000 parts of water, and 100 parts of a fabric of polyamide fiber are dyed in it for 1 hour at 95°–100°. A yellow dyeing is obtained which has very good light and wet fastness.

Depending on the nature of the substrate, deep, fast dyeings and excellent color yield can be obtained with the aid of the following assistants: for jig and winch dyeing at a liquor ratio from 1:1 to 1:80 or, preferably, 1:10 to 1:30, amounts of up to 8 parts on the weight of the fiber of a sulpho-oleate, sulphonated to 99 percent, or amounts to up to 35 grams per litre of an alcohol, e.g., benzyl alcohol. The pH of the dyebath can be adjusted to 1 to 8 or, preferably, 3 to 8 with, e.g., ammonium sulphate, ammonia, acetic or formic acid.

EXAMPLE 7

100 Parts of a carpet of nylon 66 fiber are exhaustion dyed for 2 hours at 95°–100° and pH 6–6.5 in a bath of 4,000 parts of water, 0.2 part of the dye used in Example 1 and 3 parts of monosodium phosphate. The yellow dyeing on the carpet has excellent light and wet fastness.

EXAMPLE 8

The exhaustion dyeing method of Example 7 can be employed for dyeing carpets, woven fabrics or knit goods made of differential dyeing yarns, i.e., polyamide yarns having different degrees of dyeability with anionic dyes.

EXAMPLE 9

3 Parts of the dye used in Example 1 and 20 parts of urea are dissolved in 396.5 parts of water, and 2 parts of locust bean gum are strewn into the solution. To the resulting paste are added 3 parts of laurylglycol ether sulphonate containing 3 moles ethylene oxide groups, 3 parts of nonylphenyl polyglycol ether containing oxide groups, 3 parts of nonylphenyl polyglycol ether containing 4–5 moles ethylene oxide groups, and 5 parts of glacial acetic acid. A tufted carpet of nylon 66 fiber is saturated with this solution and then passed between squeeze rollers to retain 130 percent of its weight of the liquor. The dye is then fixed for 5 minutes at 100° in saturated steam. A deep, fast yellow dyeing with good fastness properties is obtained.

EXAMPLE 10

2.5 Parts of the dye specified in Example 1 are dissolved in 396.5 parts of water; 2 parts of locust bean gum are strewn into the solution, followed by 2 parts of laurylglycol ether sulphonate containing 2 moles ethylene oxide groups, 2 parts of nonylphenyl-polyglycol ether containing 4.5 moles ethylene oxide groups, and 5 parts of glacial acetic acid. The solution is made up to 1 litre with water. A carpet of nylon 66 fiber is padded with this liquor, expressed to contain 300 percent of its weight of the liquor, and fixed in saturated steam for 5 minutes at 100°. A fast, deep yellow dyeing with good fastness properties is obtained.

This padding method can be employed for a carpet made of yarns having different degrees of affinity for dyes. Attractive differential dyeing effects are obtained in this way. The degree of differentiation can be increased by fixing the dyeing in saturated steam in the wet state without intermediate drying.

EXAMPLE 11

A dyebath is prepared with 5,000 parts of water, 1 part of a dyeing assistant consisting of a mixture of the reaction product of 10 moles ethylene oxide and 1 mole 3-stearyloxy-2-hydroxy-propyldi-ethylene-triamine and oleyldecaglycol ether-oxyacetic acid, 3 parts of monosodium phosphate, 2 parts of the dye given in Example 1 and 1 part of the basic dye of formula

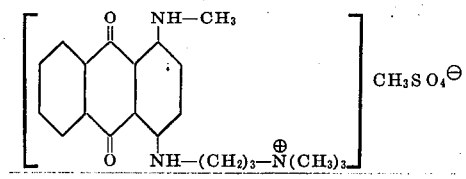

In this bath 100 parts of a yarn consisting of equal parts of normal nylon 66 yarn and a differential dyeing nylon yarn, produced by blocking the amino end groups with an acid terminator, are dyed for 2 hours at 95°–100°. The yarn of normal nylon 66 fiber is dyed yellow and that of the acid modified yarn, blue.

The dye bearing sulphonic acid groups which is used in Examples 1 to 11 can be replaced by one of the dyes of the following formulas, which give more greenish yellow dyeings with the same good fastness properties.

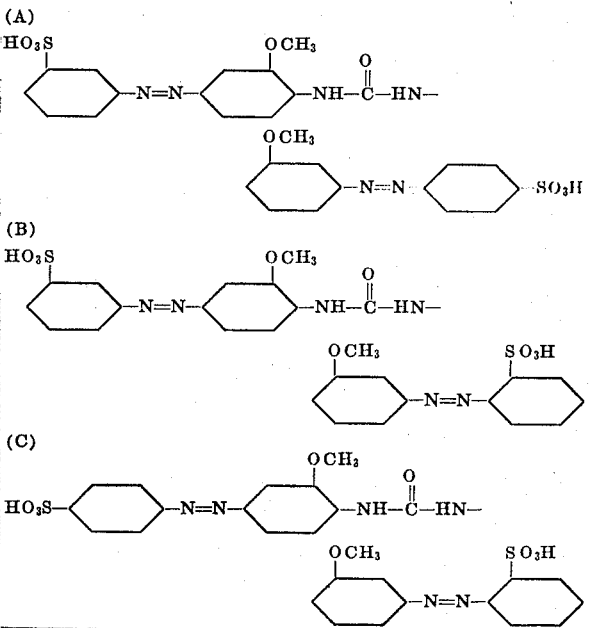

(D) 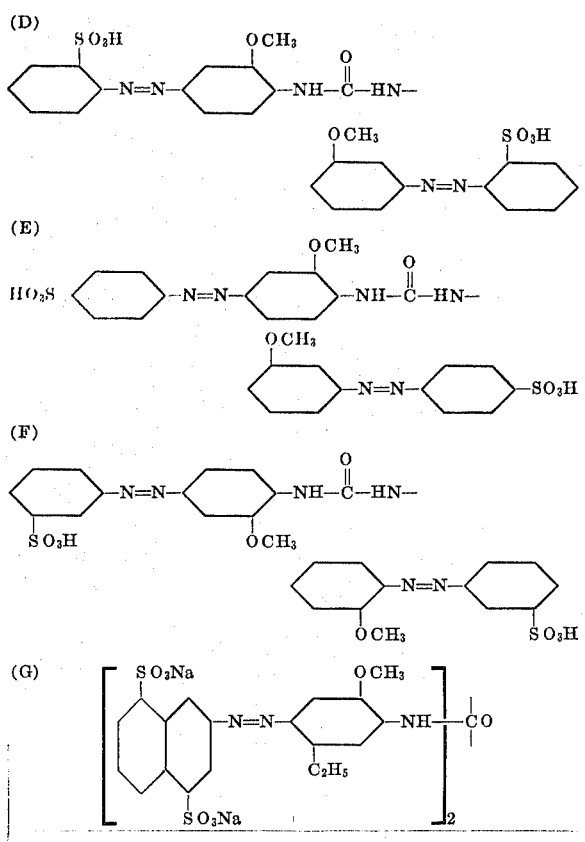

(E)

(F)

(G)

I claim:
1. A process for dyeing or printing synthetic polyamide fiber with dye of the formula

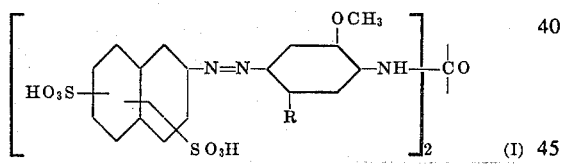

where R presents methyl or ethyl, with dye of the formula

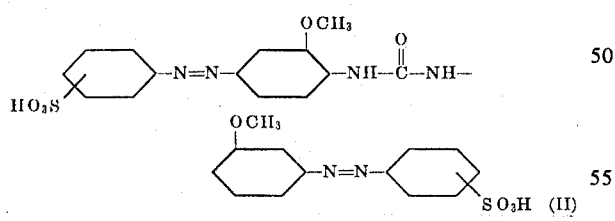

or with water-soluble salt of either.

2. A process according to claim 1, in which the dye is symmetrical dye of formula (II).
3. Synthetic polyamide fiber dyed according to claim 1.
4. A process according to claim 1 wherein the dye is dye of the formula

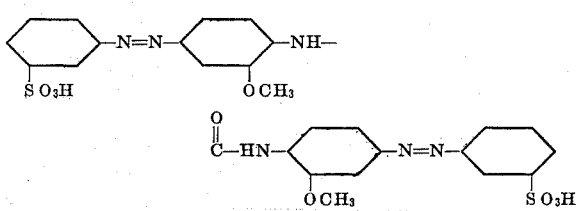

5. A process according to claim 1 wherein the dye is dye of the formula

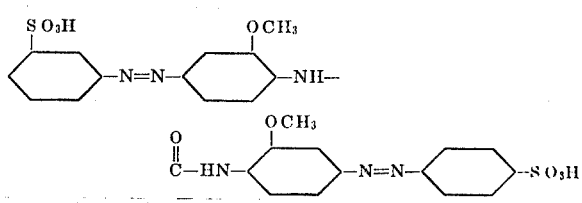

6. A process according to claim 1 wherein the dye is dye of the formula

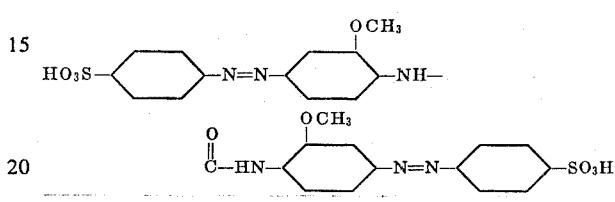

7. A process according to claim 1 wherein the dye is dye of the formula

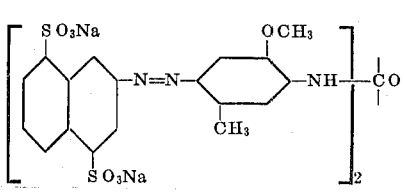

8. A process according to claim 1 wherein the water-soluble salt is an alkaline salt.
9. A process according to claim 8 wherein the alkaline salt is a sodium salt.
10. A process according to claim 1 for dyeing or printing synthetic polyamide fiber, the polyamide being selected from the group consisting of condensation products of 1,6-hexamethylene-diamine and adipic acid or sebacic acid, of polymerization products of ε-caprolactam, of condensation products of ω-aminoundecanoic acid or of mixed condensation products of 1,6-hexamethylene-diamine, adipic acid and ε-caprolactam, with dye of the formula

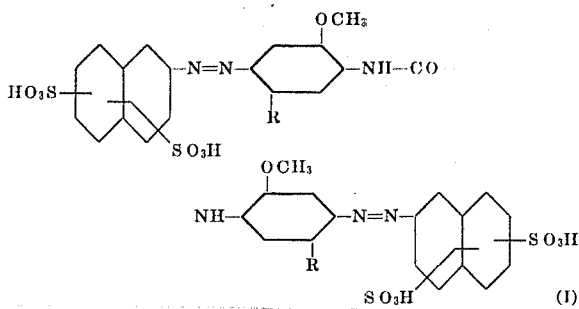

wherein R is methyl or ethyl, or with dye of the formula

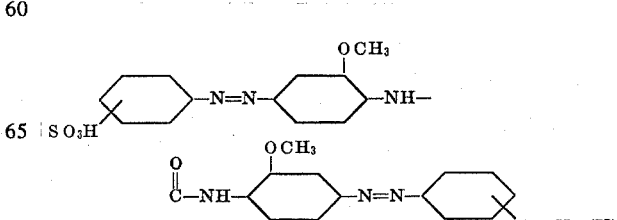

or water-soluble alkali metal salt of either.

* * * * *

PO-1050
(5/69)

UNITED STATES PATENT OFFICE
CERTIFICATE OF CORRECTION

Patent No. 3,643,269            Dated February 22, 1972

Inventor(s) AUGUST SCHWEIZER

It is certified that error appears in the above-identified patent and that said Letters Patent are hereby corrected as shown below:

Title page, line 3 of the Abstract, in the formula, "NH—⫪—CO" should read --NH—⫪ CO--; line 5, delete "or their water soluble salts"."; line 7, beneath the formula, insert --or their water soluble salts".--. Column 1, line 9, in the formula, "NH—⫪—CO" should read --NH—⫪ CO--; line 26, "of asymmetrical" should read --or asymmetrical--; line 33, "w-" should read --ω- --. Column 2, line 40, in the formula, "NH—⫪—CO" should read --NH—⫪ CO,--; line 49, "40 solution" should read --tartrate solution--.

Column 3, line 9, "carpet" should read --parts--; line 16, "CARPET" should read --carpet--; lines 71 and 72, delete "3 parts of nonylphenyl polyglycol ether containing oxide groups,". Column 5, line 12, in the formula, "HO$_3$S" should read --HO$_3$S- --; line 25, in the formula, "⬡" should read

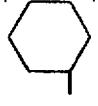

; Claim 1, line 3, in the formula "NH—⫪—CO" should read

--; "(I)" should read --(I),--; line 4, "presents" should read --represents--. Claim 4, line 4, in the second part of the formula,
"O    " should read --O    --. Claim 5, line 4, in the second part of the
 ||                   ||
C-HN-         -C-HN-

PO-1050
(5/69)

UNITED STATES PATENT OFFICE
CERTIFICATE OF CORRECTION

Patent No. 3,643,269                               Dated February 22, 1972

Inventor(s) AUGUST SCHWEIZER                              - 2 -

It is certified that error appears in the above-identified patent and that said Letters Patent are hereby corrected as shown below:

formula, "$\underset{\underset{C-HN-}{\|}}{O}$" should read --$\underset{\underset{-C-HN-}{\|}}{O}$--. Claim 6, line 4, in the second part of the formula, "$\underset{\underset{C-HN-}{\|}}{O}$" should read --$\underset{\underset{-C-HN-}{\|}}{O}$--. Claim 7, line 3, in the formula, "NH$\rightarrow$CO" should read --NH$\rightarrow$ CO--. Claim 10, line 9, in the first part of the formula, "-CO" should read -- -CO- --; line 10, in the second part of the formula, "NH-" should read -- -NH- --; "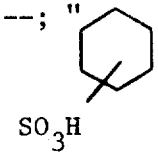" should read --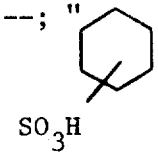--; line 12, in the first part of the formula, "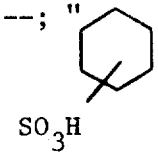" should read --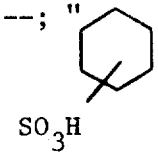--; "(I)" should read --(I),--; line 13, in the second part of the formula, "$\underset{\underset{C-}{\|}}{O}$" should read --$\underset{\underset{-C-}{\|}}{O}$--.

Signed and sealed this 1st day of May 1973.

(SEAL)
Attest:

EDWARD M. FLETCHER, JR.            ROBERT GOTTSCHALK
Attesting Officer                  Commissioner of Patents